May 27, 1969 S. A. SABA 3,445,919

METHOD OF USING A SOLDER CONTACT FLUID

Filed July 11, 1968

INVENTOR
SABA A. SABA

BY Nilsson + Robbins
ATTORNEYS

United States Patent Office 3,445,919
Patented May 27, 1969

3,445,919

METHOD OF USING A SOLDER CONTACT FLUID

Saba A. Saba, Fountain Valley, Calif., assignor to Electronic Engineering Company of California, a corporation of California Filed July 11, 1968, Ser. No. 744,234
Int. Cl. B23k *35/22*
U.S. Cl. 29—471.1 10 Claims

ABSTRACT OF THE DISCLOSURE

Molten solder, or solder to be melted, is contacted during processing thereof with a hydrophilic, but otherwise unctuous, organic material having a flash point substantially greater than the temperature at which the solder is processed. The organic material is an oil-in-water emulsifier exemplified by a higher fatty acid ester of a polyhydric alcohol, the ester having one or more substituents thereon of sufficient hydrophilic nature to cause the ester to be hydrophilic. A specific material is the higher fatty acid ester of sorbitan substituted with polyoxyethylene.

BACKGROUND OF THE INVENTION

*Field of the invention*

The field of art to which the invention pertains includes the field of soldering.

*Description of the prior art*

With the advent of circuit boards, automated soldering became feasible and various methods of applying solder to a circuit board were advised. In one method, the solder is maintained as a liquid in a "solder pot" and the underside of the circuit board is dipped into the solder. Solder adheres to the leads protruding through the circuit board holes. In other methods, molten solder is agitated so as to be in motion when in contact with the circuit board. In one variation, called wave soldering, solder is pumped up from beneath its surface to form a wave. The wave is about one inch thick and extends an inch or two above the surface of the molten solder, substantially along the full width of the solder pot. The circuit board is slowly passed horizontally over the wave, to be thereby soldered. In some systems, the circuit board is initially wetted with a flux which also may be applied by wave techniques.

A drawback to using molten solder is the tendency of the solder to oxidize, forming a dross on its surface. Movement of the solder in wave soldering systems reduces such oxidation but it does not entirely eliminate it. The solder also tends to form icicles and generally lacks brightness. In order to overcome these drawbacks, oil has been used to cover the solder in solder pots and in wave soldering machines and the like. The oil helps to prevent oxidation of the solder, thereby preventing the formation of dross, and inhibits the formation of icicles. In wave soldering machines oil is additionally injected onto the solder wave and helps to prevent the formation of bubbles in the solder. The oil, of course, must be stable at the high temperatures at which the solder is kept molten, typically about 495° F. At such temperatures, the hot oil also acts to prevent the solder from bridging from one lead to another.

In another, related application, the hot oil is used to remove solder from leads and coated circuits on circuit boards. In this case, the hot oil is used as a heat transfer medium and flow agent and is applied under pressure to the circuit board to remove the solder therefrom.

There have been three basic types of oil used: (1) animal oils and fats, (2) vegetable oils and (3) mineral oils. In each case, the material must have a flash point higher than the temperature at which the solder is processed. The most commonly used solder melts at 361° F. but the soldering processes operate at temperatures much higher than that, as indicated about 495° F., to achieve better flow properties. However, oils that have been utilized have flash points of from 520–570° F., leaving only narrow margins of safety. Additionally, the foregoing oils are hydrophobic, requiring organic solvents for cleaning. Even then it is often found that oil residues are left on the boards and detract from their appearance.

SUMMARY OF THE INVENTION

In the present invention, a liquid medium is utilized for high temperature contact of molten solder that alleviates the foregoing drawbacks. The medium has a high flash point for greater safety and protects the solder against dross formation. It effectively prevents icicling and bridging and imparts a lustrous appearance to the solder. It is compatible with rosin fluxes and acts as a cleanser for the printed circuit boards. It has a relatively long operating life and is relatively inexpensive. In contrast to prior materials, the present medium comprises a water-soluble, but otherwise unctuous, organic material. This feature combined with a very high flash point enables the medium to be utilized in all solder contact operations where otherwise an oil would have been utilized and yet provides a degree of safety and ease of use not heretofore obtainable. Solder contact fluids are provided having flash points substantially higher than the flash points of presently commercial material without any sacrifice in handling ability or oxidation protection. The materials of this invention are generally soluble in either hot or cold water allowing printed circuit boards to be readily cleaned with brush and soap. The solder has a lustrous appearance not generally obtainable with prior materials. Protection against oxidation and operating life can be enhanced by the incorporation of a minor amount of antioxidant.

In particular embodiments, the organic material is an oil-in-water emulsifier. It is also miscible with rosin fluxes simplifying apparatus clean up procedures. In further embodiments, the organic material is a higher fatty acid ester of a polyhydric alcohol, the ester having one or more substituents thereon of sufficient hydrophilic nature to cause the ester to be hydrophilic. Monoesters of hexahydric alcohols or anhydrides thereof, such as sorbitan, coupled with a substituent imparting hydrophilic properties thereto, are very effective. Polyoxyethylene groups are particularly effective substituents; the number of moles of ethylene oxide in its chain can be varied to impart a desired hydrophilic character to the medium.

DESCRIPTION OF THE PREFERRED EMBODIMENTS

Figure 1:
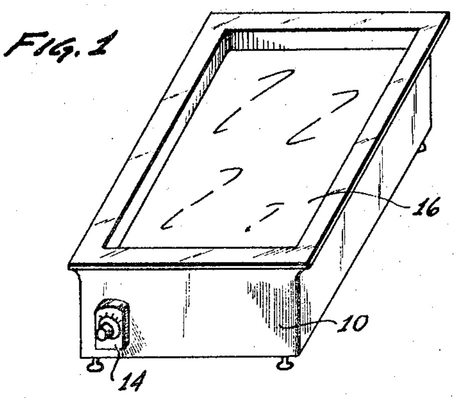
FIGURE 1 is an isometric view of a solder pot in which the solder flow medium of this invention can be utilized.
Figure 2:
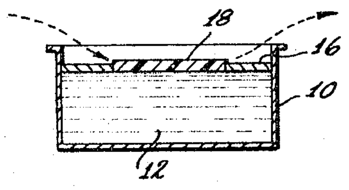
FIGURE 2 is a diagrammatic, cross-sectional view of a solder pot and illustrating a solder dipping operation.

Referring to FIGURES 1 and 2, a solder pot 10 is shown containing a reservoir of molten solder 12, maintained molten by means of an electrical heater (not shown) and control 14 therefor. A "solder blanket" of fluid medium 16 of this invention is floated over the surface of the solder reservoir 12 to maintain the surface relatively oxide free and prevent the formation of dross. A prefluxed printed-circuit board 18 is simply dipped at a slow rate into the solder pot, through the layer of fluid medium 16, into contact with the solder 12 and, after a specified period, is withdrawn from the solder.

Figure 3:
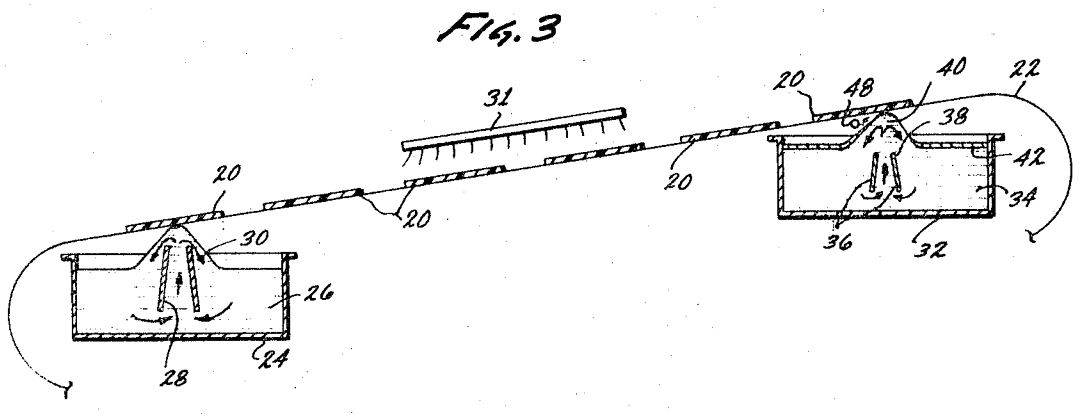
FIGURE 3 is a diagrammatic, cross-sectional view of portions of a wave soldering machine.

Referring to FIGURE 3, the operation of a wave soldering machine is diagrammatically illustrated. A printed-circuit board 20 is carried by a conveyor rack 22 past a reservoir tank 24 of rosin flux 26. A continuous stream of flux 26 is pumped into a spout 28, which extends somewhat above the surface of the flux 26, to form a head of flux 30 through which the work can be passed and wetted with flux. From there, the circuit board travels to a preheating station 30 and from there to the wave soldering section of the device. The wave soldering section contains a reservoir tank 32 of molten solder 34 which may be similar to the solder pot 10 of FIGURE 1. An elongated spout 36 is disposed within the solder pot 32 and extends the full width thereof, the lips 38 of the spout 36 lying just beneath the surface of the molten solder. A pump is provided (not shown) which pumps the solder 34 into the bottom of the spout 36 and up through the lips 38 to form a "wave" 40 of molten solder several inches above the surface of the reservoir of solder 34. A layer of fluid medium 42 of this invention is provided overlying the molten solder reservoir 34 to reduce drossing of the solder and enhance solder flow.

Figure 4:
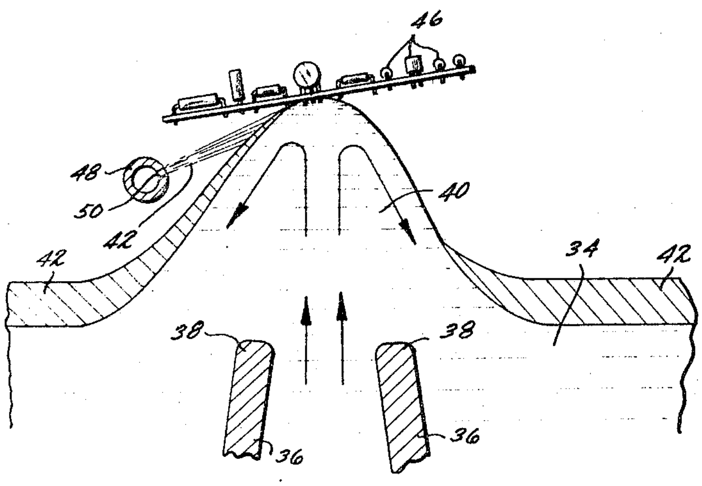
FIGURE 4 is a diagrammatic, cross-sectional view of a circuit board in contact with a solder wave.

Referring to FIGURE 4, a close up of the solder wave 40 is illustrated in contact with the undeside of a circuit board 44 having the leads from a varity of electrical components 46 extending therethrough. The fluid medium 42 is pumped up into an elongated circuit 48 having apertures 50 therein through which the fluid medium 42 is squirted onto the solder wave 40 just prior to its contact with the circuit board 44. By providing this fluid injection step, particularly with the fluid mediums of this invention, very lustrous, bright solder deposits are obtained.

In the above illustrations, the fluid medium 16 and 42 is a hydrophilic, oil-in-water emulsifier sold by the Emery Chemical Company under the trade name Emsorb 6910. It is a monoester of palmitic acid and anhydrous sorbitol (sorbitan) substituted with polyoxyethylene having twenty moles of ethylene oxide in its chain. This material has a flash point of 360° F. which is substantially higher than the flash points of the presently commercial "solder covers." It is completely soluble in hot or cold water. It is soluble in xylene and dispersible in propylene glycol, but it is insoluble in mineral oil. Its hydrophilic nature allows it to be washed with water from the printed-circuit board. It does not leave a residue on the board and leaves lustrous, bright solder deposits. It is liquid at room temperature, has a maximum acid value of 2.0, saponification value of 43–49, a hydroxyl value of 89–105, a specific gravity (25° C./4° C.) of 1.1, and a viscosity at 25° C. of 600 cps In utilizing the fluid medium of this invention a minor amount, eg. from 0.1 to 10 weight percent of an antioxidant can be incorporated to enhance the protective effect of the medium and to extend its operational life. In this particular case, 3.5 weight percent of bisphenol was added as an antioxidant to the Emsorb 6910 emulsifier. The resultant composition can be maintained at high solder waving temperatures for up to eight days without requiring change-over.

In general, materials suitable as fluid mediums of this invention comprise hydrophilic, but otherwise unctuous, organic material having flash points substantially greater than the temperature at which the molten solder is being processed. Generally, a high molecular weight material can be utilized that is fluid at the processing temperature and preferably, but not necessarily, fluid at room temperature. The material should be preferably miscible with the rosin flux and should contain sufficient substituents of a hydrophilic nature to impart a hydrophilic character thereto.

Particularly suitable materials are oil-in-water emulsifiers and any such emulsifier fulfilling the foregoing requirements can be utilized to give at least some of the advantages of the invention. Thus, anionic emulsifiers, cationic emulsifiers and non-ionic emulsifiers can all be so utilized. Examples of anionic emulsifiers include the sulphonic acids and their salts such as the aliphatic sulphonates, ester sulphonates, amide sulphonates, sulphonates of aliphatic-aromatic hydrocarbons, and the like; aliphatic sulphonates such as sulphated fatty alcohols, sulphated fatty glycerides, esters and acids, sulphated olefins, sulphonated oils, and the like; and such materials as phosphates and carboxylates. Examples of cationic emulsifiers include quaternary ammonium compounds, pyridinium compounds, amine salts and the like. Examples of non-ionic emulsifiers include suitably substituted fatty esters of glycol, sorbitool and mannitol, or anhydrides thereof; substituted betaines; polymerized dioxolanes; derivative or polyglycerols; polyethenoxy compounds; and the like. Still other materials include various polymers and macromolecules, suitably treated to be hydrophilic. The foregoing and other emulsifiers are described in detail in Surface Activity by J. L. Moilliet, B. Collie and W. Black (1961), D. Van Nostrand Co., Inc., Princeton, N.J., incorporated herein by reference.

The non-ionic emulsifiers are particularly suitable from the point of view of cost-effectiveness, ready availability and appropriateness of flash point. The higher (12–24 carbon atoms) fatty acid esters of polyhydric alcohols are particularly suitable where the ester has one or more substituents thereon of sufficient hydrophilic nature to cause the ester to be hydrophilic. Thus, such fatty acid esters of glycol, glycerol, propylene glycol, mannitol, and the like, can be utilized. Of particular effectiveness are the higher fatty acid esters of hexahydric alcohols and anhydrides thereof, such as the esters of sorbitol, sorbitan, mannitol and dulcitol, when additionally containing substituents of sufficient hydrophilic nature to cause the esters to be hydrophilic.

Polyoxyethylene groups are particularly suitable substituents for imparting hydrophilic properties in that they are inexpensive and, by varying the number of moles of ethylene oxide in its chain, one can tailor the hydrophilic properties to suit the molecule to which it is attached. The mechanism of ethylene oxide condensation and solubility relationships therewith are discussed in depth in Non-Ionic Surfactants, edited by M. J. Shick (dated 1967, copyright 1966), Marcel Dekker, Inc., New York, incorporated herein by reference. In general, the greater the number of moles of ethylene oxide in the chain of polyoxethylene, the stronger its hydrophilic character. Thus, sorbitan monooleate substituted with polyoxethylene having twenty moles of ethylene oxide in its chain is soluble in water, insoluble in mineral oil and has a flash point of 605° F. (such a material being sold by the Emery Chemical Company under the trade name Emsorb 6900). In contrast sorbitant monooleate from the same manufacturer (Emsorb 6901) substituted with polyoxethylene having only five moles of ethylene oxide in its chain, is only dispersible in water, is soluble in mineral oil and the flash point is only 550° F. Because the latter compound is dispersible in water and has a flash point above the temperature at which solder is normally processed, it is still usable in our invention, although not a preferred material.

The length of the polyoxethylene chain is not in itself a sufficient guide for determining suitability of a material, but must be balanced with the nature of the material that is substituted therewith. For example, sorbitan monostearate substituted with polyoxethylene having twenty moles of ethylene oxides in its chain (Emsorb 6905) is soluble in water and insoluble in mineral oil, whereas sorbitan tristearate substituted with the same polyoxethylene (Emsorb 6907) is merely dispersible in water, as well as in mineral oil. The flash point of the former material is 545° F. compared to 530° F. for the latter material. In general, monoesters yield fluids with greater water solubility and higher flash points. Thus, sorbitan monoolaurate, substituted with polyoxethylene having twenty moles of ethylene oxide in its chain, (Emsorb 6915) is soluble in water, insoluble in mineral oil and has a flash point of 610° F.

Athough the solder fluids of this invention are hydrophilic, they are otherwise unctuous and are generally miscible with rosin fluxes. Accordingly, lengthy clean up procedures are not required.

It was noted that an antioxidant can be utilized. Phenolic antioxidants, such as bisphenol, catechol, tertiary butylated anisole, 2,6-di-tertiary-butylphenol, methylene bisphenol, and the like, aromatic amines, such as para-benzylaminophenol, 2,6-di-ethyl-aniline, and the like and a variety of other materials such as phenyl-beta-naphthylamine and di-beta-naphthyl-para-phenylenediamine, can be utilized. Many other suitable antioxidants are well known in the art.

The solder fluids of this invention can be utilized as above, for depositing solder onto printed-circuit boards, or it can be utilized to remove solder. In the latter process the fluid is heated to temperature well in excess of the melting point of solder and is applied under pressure to a soldered circuit board whereupon it melts the solder, removing it from the circuit board. In this instance, the fluids are acting as heat transfer mediums and flow mediums. The enhanced properties of the fluids, increased flash point and water solubility, enable the fluids to be utilized in this function with great facility and with advantages of safety and clean-up not obtainable with presently commercial materials.

What is claimed is:

1. In a process in which solder is in contact with a liquid medium at a temperature in excess of the melting point of said solder, the improvement wherein said medium comprises a hydrophilic, but otherwise unctuous, organic material having a flash point substantially greater than said temperature.

2. The process of claim 1 wherein said organic material is liquid at room temperature.

3. The process of claim 1 wherein said organic material is miscible with rosin flux.

4. The process of claim 1 wherein said medium includes a minor amount of antioxidant.

5. The process of claim 1 wherein said organic material is an oil-in-water emulsifier.

6. The process of claim 1 wherein said organic material is a higher fatty acid ester of a polyhydric alcohol, said ester having one or more substituents thereon of sufficient hydrophilic nature to cause said ester to be hydrophilic.

7. The process of claim 6 wherein said ester is substantially a monoester of said alcohol.

8. The process of claim 6 wherein said substituent is a polyoxyethylene group.

9. The process of claim 6 wherein said polyhydric alcolol is selected from hexahydric alcohols and anhydrides thereof.

10. The process of claim 1 wherein said organic material is a higher fatty acid ester of sorbitan substituted with polyoxyethylene, said polyoxyethylene having a sufficient number of moles of ethylene oxide in its chain to impart hydrophilic character to said ester.

References Cited

UNITED STATES PATENTS

| | | | |
|---|---|---|---|
| 2,573,882 | 11/1951 | Waters. | |
| 3,058,441 | 10/1962 | Walker et al. | |
| 3,190,527 | 6/1965 | Tardoskegy | 228—37 |
| 3,298,588 | 1/1967 | Shompe. | |
| 3,359,132 | 12/1967 | Wittmann. | |

JOHN F. CAMPBELL, *Primary Examiner.*

J. L. CLINE, *Assistant Examiner.*

U.S. Cl. X.R.

29—492, 495; 228—34, 37